US012306480B2

(12) United States Patent
Tanaka et al.

(10) Patent No.: US 12,306,480 B2
(45) Date of Patent: May 20, 2025

(54) GLASS INTERPOSER OPTICAL RESONATOR DEVICE AND METHOD

(71) Applicant: Intel Corporation, Santa Clara, CA (US)

(72) Inventors: Hiroki Tanaka, Chandler, AZ (US); Brandon C Marin, Chandler, AZ (US); Kristof Darmawikarta, Chandler, AZ (US); Srinivas Venkata Ramanuja Pietambaram, Chandler, AZ (US); Jeremy D Ecton, Gilbert, AZ (US); Rajeev Ranjan, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 721 days.

(21) Appl. No.: 17/470,652

(22) Filed: Sep. 9, 2021

(65) Prior Publication Data

US 2023/0072096 A1 Mar. 9, 2023

(51) Int. Cl.
G02F 1/035 (2006.01)
G02F 1/03 (2006.01)

(52) U.S. Cl.
CPC ............ *G02F 1/035* (2013.01); *G02F 1/0311* (2013.01)

(58) Field of Classification Search
CPC .............................. G02F 1/035; G02F 1/0311
See application file for complete search history.

(56) References Cited

U.S. PATENT DOCUMENTS

| | | | |
|---|---|---|---|
| 11,178,473 B1 * | 11/2021 | Nagarajan | H04B 10/40 |
| 2017/0289652 A1 | 10/2017 | Rickman | |
| 2019/0285804 A1 | 9/2019 | Ramachandran et al. | |
| 2020/0153515 A1 | 5/2020 | Goergen et al. | |
| 2021/0257288 A1 | 8/2021 | Meade | |
| 2022/0190922 A1 * | 6/2022 | Vegas Olmos | H01S 5/1071 |
| 2022/0276455 A1 * | 9/2022 | Rubinstein | G02B 6/12004 |
| 2023/0072096 A1 | 3/2023 | Tanaka et al. | |
| 2023/0076917 A1 | 3/2023 | Tanaka et al. | |
| 2024/0220840 A1 * | 7/2024 | Jacob | G02F 1/353 |

FOREIGN PATENT DOCUMENTS

WO 2019207363 A1 10/2019

OTHER PUBLICATIONS

International Application Serial No. PCT US2022 039973, International Search Report mailed Nov. 21, 2022, 7 pages.
International Application Serial No. PCT US2022 039973, Written Opinion mailed Nov. 21, 2022, 6 pages.

* cited by examiner

*Primary Examiner* — Sung H Pak
(74) *Attorney, Agent, or Firm* — Akona IP PC

(57) ABSTRACT

An electro-optical system having one or more electro-optical devices integrally formed within a substrate and associated methods are disclosed. An electro-optical system including an electro-optic switch is shown. An electro-optical system including an electro-optic modulator is shown. An electro-optical system including an optical resonator is shown.

15 Claims, 10 Drawing Sheets

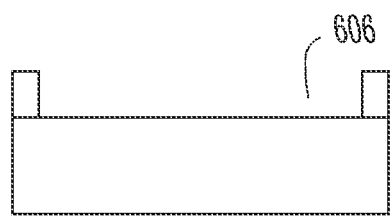
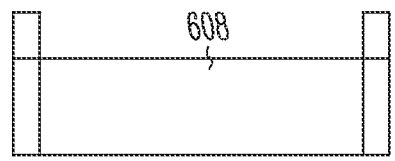
Fig. 6C　　　　　　　　Fig. 6D
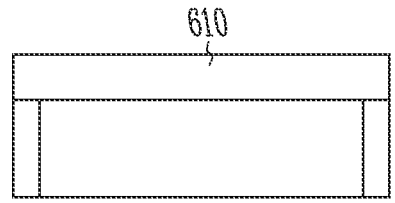
Fig. 6E　　　　　　　　Fig. 6F
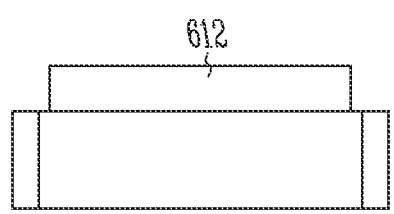
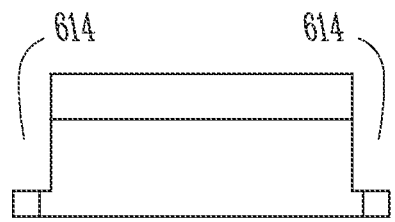
Fig. 6G　　　　　　　　Fig. 6H

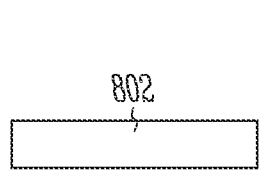
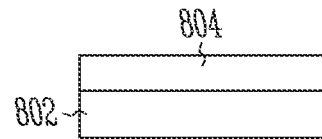
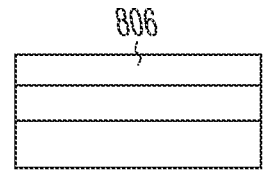
*Fig. 8A*          *Fig. 8B*          *Fig. 8C*
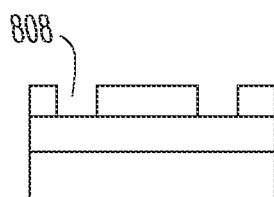
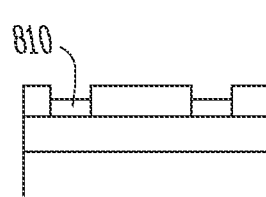
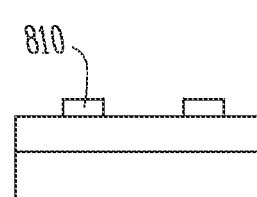
*Fig. 8D*          *Fig. 8E*          *Fig. 8F*
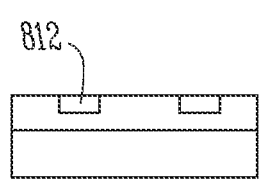
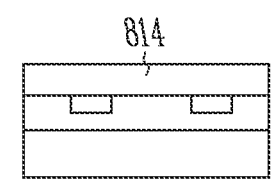
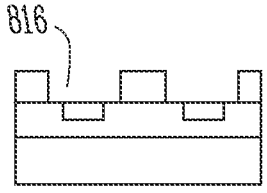
*Fig. 8G*          *Fig. 8H*          *Fig. 8I*
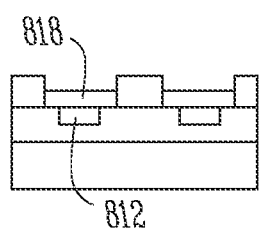
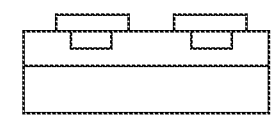
*Fig. 8J*          *Fig. 8K*

GLASS INTERPOSER OPTICAL RESONATOR DEVICE AND METHOD

TECHNICAL FIELD

Embodiments described herein generally relate to semiconductor and photonic devices. Selected examples include devices with photonic integrated circuits and optical components integrally formed with a glass interposer.

BACKGROUND

Increased communication speed and bandwidth between devices is desired. Optical fiber communication is one technology that provides faster communication than some electronic communication with higher bandwidth. It is desired to provide optical data transmission with smaller form factors at lower manufacturing price points. These technical goals, among other improvements are addressed by examples described in the following disclosure.

BRIEF DESCRIPTION OF THE DRAWINGS

FIG. 8A-K shows selected manufacturing steps to form an electro-optical switch in accordance with some example embodiments.

DESCRIPTION OF EMBODIMENTS

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
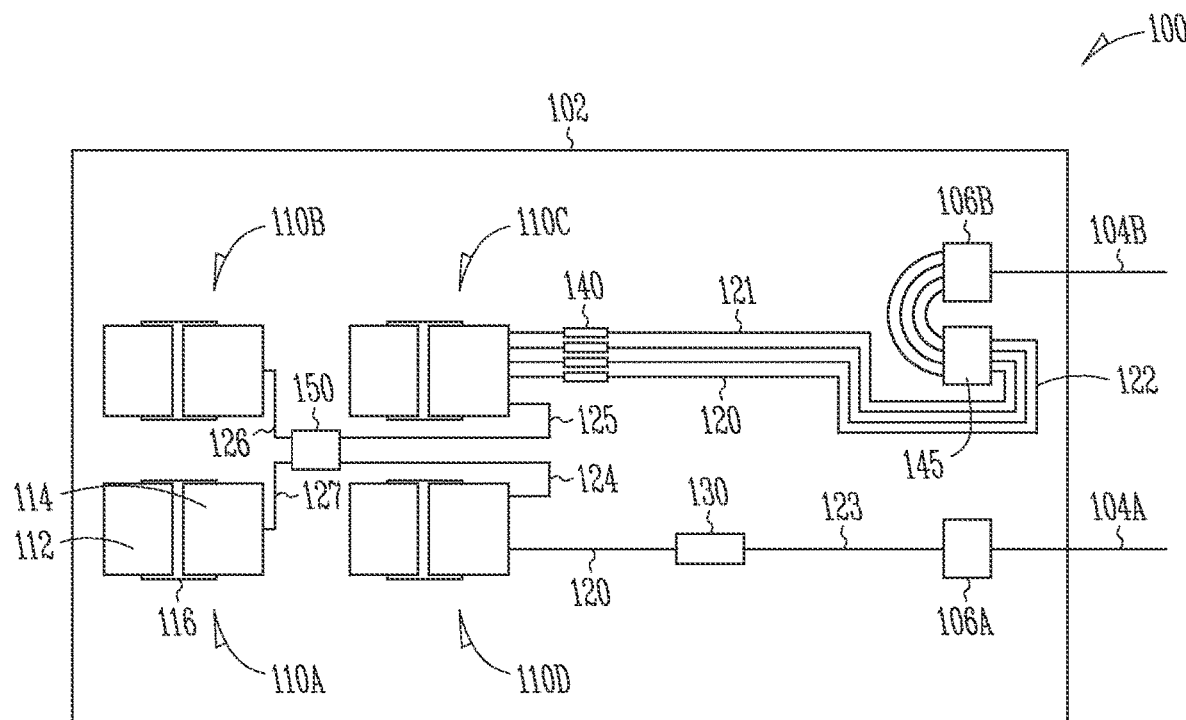
FIG. 1A shows a top view of an electro-optic device in accordance with some example embodiments.

FIG. 1A shows an electro-optical system 100 according to one example. A number of chip sets 110 are shown on a common substrate 102. In one example, the substrate 102 is a glass interposer. One example of a glass interposer includes silicon dioxide glass. One example of a glass interposer includes a doped silicon dioxide glass. One example of a glass interposer includes quartz. In one example, the glass interposer 102 is configured to mount to a subsequent circuit board. In the example of FIG. 1A, four chip sets 110A, 110B, 110C and 110D are shown as an example. Other numbers of chip sets 110 are also possible in different variations of electro-optical system 100. System 100 may include only one chip set 110, or it may include more than four chip sets 110 depending on a desired application.

Figure 1B:
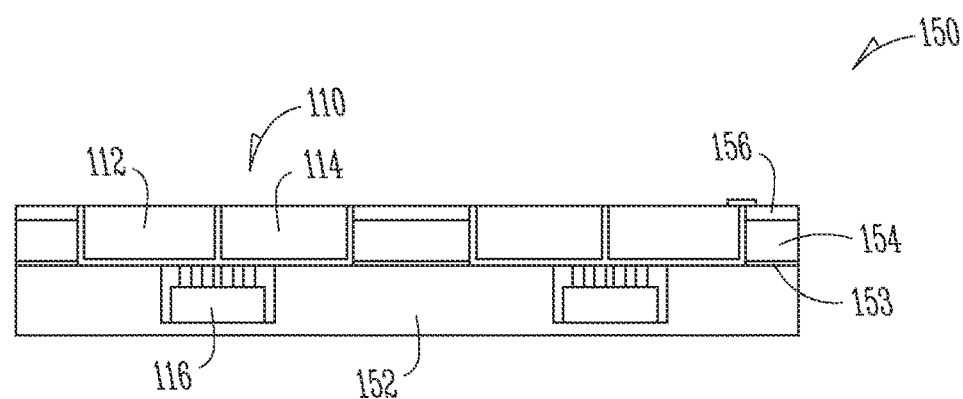
FIG. 1B shows a cross section view of a portion of an electro-optic device in accordance with some example embodiments.

In one example, one or more chip sub-assemblies 110 include an electronic integrated circuit (EIC) 112 such as a silicon chip with electrical conductors, inputs and outputs. In one example one or more chip sub-assemblies 110 further include a photonic integrated circuit (PIC) 114 that includes one or more optical inputs and/or outputs. An interconnect bridge 116, such as a silicon bridge die, is shown in FIGS. 1A and 1B coupling between the EIC and the PIC. Other interconnect bridges are possible, including, but not limited to organic bridges, ceramic bridges, etc.

A number of optical and electro-optical devices are illustrated in FIG. 1A and integrated with the glass interposer 102. Waveguides 120 are shown coupling between optical fibers 104A, 104B at an edge of the electro-optical system 100 and the one or more chip sub-assemblies 110A-D. The optical fibers 104A, 104B are coupled to the glass interposer 102 by respective optical fiber connectors 106A, 106B. The number of optical and electro-optical devices are shown located between the optical fibers 104A, 104B and the one or more chip sub-assemblies 110A-D.

One example optical or electro-optical device in FIG. 1A includes an electro-optic modulator 130. Another optical or electro-optical device in FIG. 1A includes an optical resonator 140. Another optical or electro-optical device in FIG. 1A includes an electro-optic switch 150. Detailed description of each of these optical or electro-optical devices is included below.

As shown in FIG. 1B, in selected examples, the chip sub-assembly 110 is at least partially embedded within the glass interposer. In FIG. 1B, a base glass interposer 152 is shown with the interconnect bridge 116 embedded within a cavity. A second glass layer 154 is shown attached to the base glass interposer 152, although other example configurations may not include multiple glass layers, and instead include a monolithic interposer. In the example of FIG. 1B, the PIC and EIC are shown at least partially embedded within the second glass layer 154. A third glass layer 156 is further shown in FIG. 1B. In one example, the third glass layer 156 includes an electro-optic material such as GaAs, $PbMoO_4$, $TeO_2$, $Tl_3As_4$, $SrO_{0.75}Ba_{0.25}Nb_2O_6$, $LiNbO_3$, $LiTaO_3$, etc. Electro-optical materials include variable properties that depend on an applied voltage or current. Examples of variable properties include, but are not limited to index of refraction changes, transmittance changes, etc. Devices including electro-optical materials can be fabricated to be integral with a glass substrate such as glass interposer 102, 152. By making one or more optical or electro-optical devices 130, 140, 150 integral with the glass substrate or glass interposer 102, 152, the higher level electro-optic system 100 can be made smaller, thinner, and for a lower manufacturing cost.

Figure 2A:
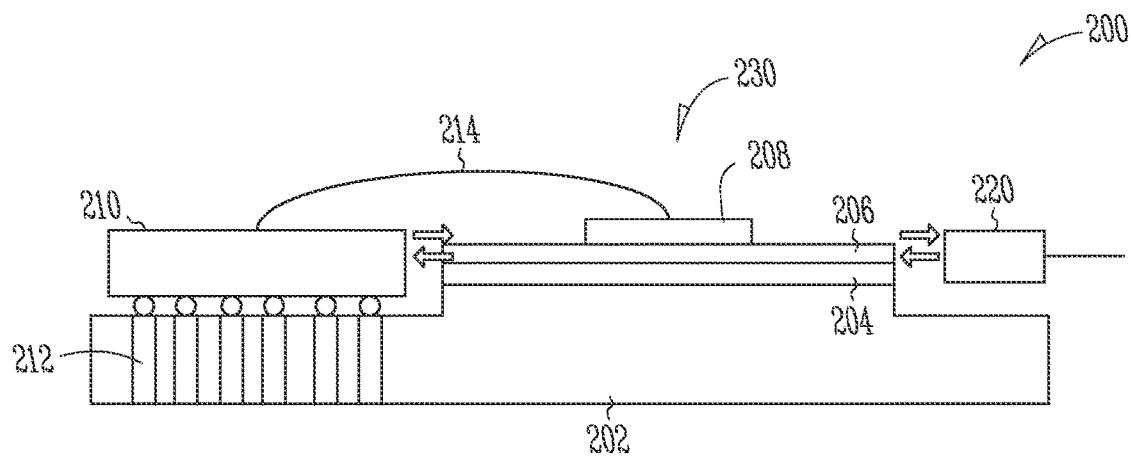
FIG. 2A shows a cross section view of an electro-optical modulator in accordance with some example embodiments.
Figure 2B:
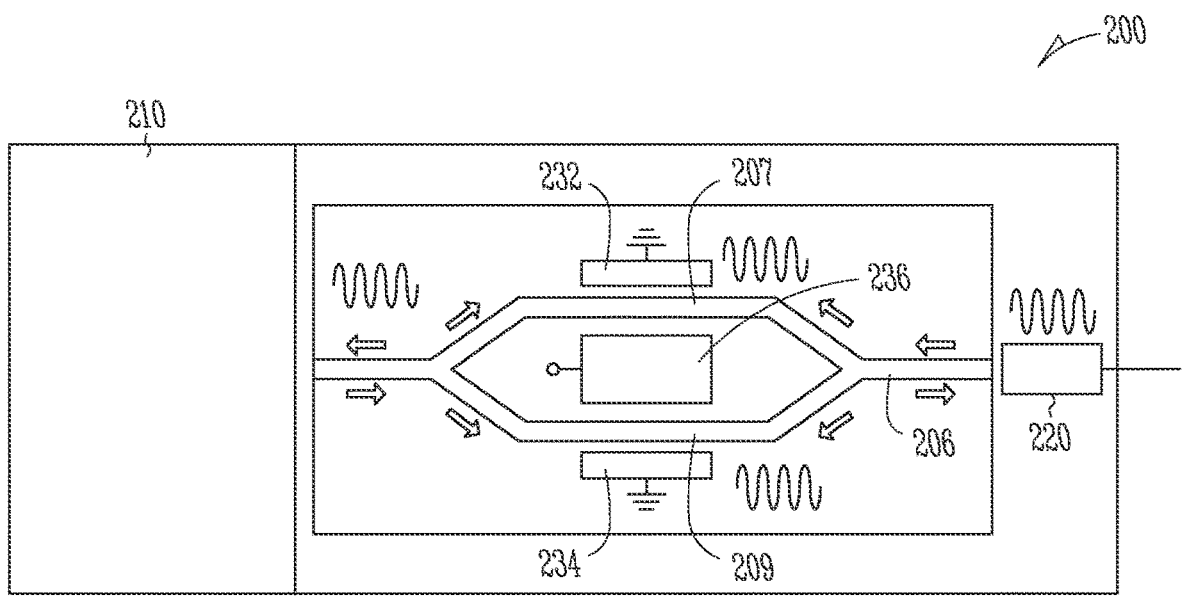
FIG. 2B shows a top view of the electro-optical modulator from FIG. 2A in accordance with some example embodiments.
Figure 3A:
FIG. 3A-K shows selected manufacturing steps to form an electro-optical modulator in accordance with some example embodiments.
Figure 3B:
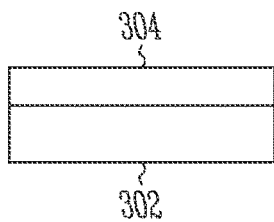
Figure 3C:
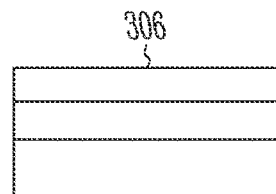
Figure 3D:
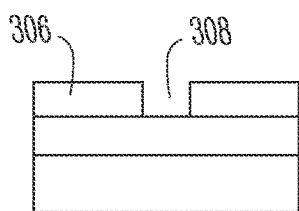
Figure 3E:
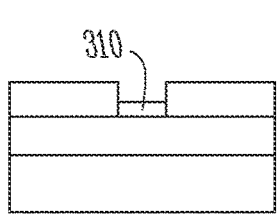
Figure 3F:
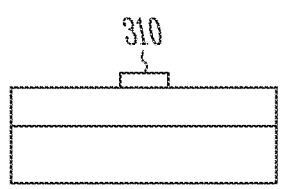
Figure 3G:
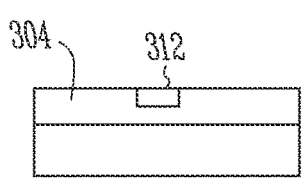
Figure 3H:
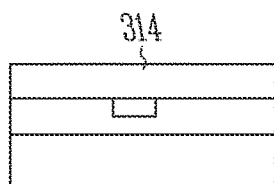
Figure 3I:
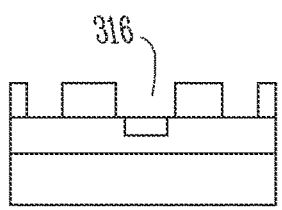
Figure 3J:
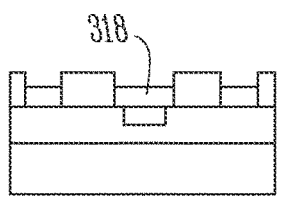
Figure 3K:
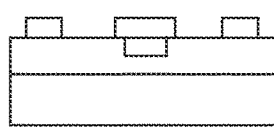

FIGS. 2A and 2B show an electro-optic modulator 230 incorporated into a system 200 similar to a portion of electro-optical system 100 from FIG. 1A. System 200 includes a PIC 210 and an optical fiber 220 coupled to a substrate 202, such as a glass interposer. In one example, the electro-optic modulator 230 includes a Mach-Zehnder modulator. In the example of FIG. 2A, a wirebond connection 214 is coupled between the electro-optic modulator 230 and the PIC 210 to facilitate feedback and control of the electro-optic modulator 230. Although a wirebond connection 214 is shown, the invention is not so limited. Other connections such as electrical traces or alternate wiring configurations are also possible.

The PIC 210 is further shown with vias 212 that pass through the substrate 202 for subsequent connection to a circuit board or additional substrate. As noted above, the substrate 202 may be a glass interposer. In FIG. 2A, an electro-optical material layer 204 is located over the substrate 202, and one or more waveguides 206 are formed either on, on within the opto-electric layer 204. A metallic layer 208 is further shown over the waveguides 206 and electro-optical material layer 204. In one example, the metallic layer 208 is used to facilitate fabrication of one or more components of the electro-optic modulator 230. Similar to the example of FIG. 1B, in one example the electro-optical material may include GaAs, $PbMoO_4$, $TeO_2$, $Tl_3As_4$, $SrO_{0.75}Ba_{0.25}Nb_2O_6$, $LiNbO_3$, $LiTaO_3$, etc. Example method of depositing the electro-optical material include, but are not limited to, sputtering, pulsed laser deposition, chemical vapor deposition, liquid phase epitaxy, sol-gel processing, etc. The inclusion of an electro-optical material on the substrate 202 facilitates integral fabrication of the electro-optic modulator 230 and reduced device size and device manufacturing cost.

In another option an electro-optical material can be formed separately on a substrate wafer, such as silicon. Devices such as an electro-optical modulator, wave guide, resonator, directional coupler, etc. can be formed with the electro-optical material on the separate wafer. Then, the electro-optical substrate with the formed electro-optical device can be removed from the wafer and mounted with a PIC, for example on a glass interposer. In this approach, a manufacturing and assembly processes can be simplified because the electro-optical devices can be manufactured separately in parallel with PIC substrates/interposers and possibly from an external supplier.

FIG. 2B shows a top view of the electro-optic modulator 230 from FIG. 2A. A first waveguide 206 is shown adjacent to the optical fiber 220 that is then split into two adjacent waveguides 207, 209, and re-combined again adjacent to the PIC 210. One or more first electrodes 236, a second electrode 232, and a third electrode 234 are formed from the metallic layer 208. Using the electrodes 236, 232, 234, two different electric fields can be independent controlled within the adjacent waveguides 207 and 209. Control of the electric fields is used to vary a material property within the waveguides 207, 209. In one example the material property that is varied is an index of refraction. By changing a comparative index of refraction between the waveguide 207 and waveguide 209, an amount of constructive or destructive interference in an optical signal at either end of the recombined waveguide 206 can be controlled. In operation, the electro-optic modulator 230 can therefore be used to modulate an output on either side of the electro-optic modulator 230 within the re-combined waveguide 206.

FIG. 3 shows one example of a manufacturing flow used to form the electro-optic modulator 230. In operation A, a glass substrate 302 is provided. In operation B, an electro-optical material 304 such as an example material listed above is deposited in a layer over the glass substrate 302. In operation C, a mask layer 306 is layered over the electro-optical material 304. In operation D, one or more openings 308 are formed in the a mask layer 306. In operation E, a dopant material 310 is formed within the opening 308. In one example a dopant material includes titanium, and the electro-optical material 304 includes $LiNbO_3$, although the invention is not so limited. Example method of depositing the dopant material 310 include, but are not limited to, sputtering, pulsed laser deposition, chemical vapor deposition, liquid phase epitaxy, sol-gel processing, etc.

In operation F, the remaining mask layer 306 is removed from the electro-optical material 304, leaving the dopant material 310 on a selected region of the electro-optical material 304. In operation G, an anneal or similar operation is performed, and the dopant material 310 is diffused into a selected region 312. In one example, selected region 312 operates as a waveguide, such as waveguides 206, 207, 209 from FIG. 2B. In one example due to high processing temperature in diffusion, a quartz substrate 302 is used to withstand the operation. In one example, the electro-optical material 304 may be doped separately and later attached to the substrate 302 to avoid adverse effects from high diffusion temperatures.

In operation H, a second mask layer 314 is formed over the electro-optical material 304 and the selected region 312. In operation I, second regions 316 are formed within the second mask layer 314. In operation J, metal, such as copper or another conductor is deposited to form components 318 such as electrodes 236, 232, 234 from FIG. 2B. In operation K, the remaining second mask layer 314 is removed, and the electro-optic modulator 230 as shown in FIG. 2B is complete. One advantage of integral formation of devices such as electro-optic modulator 230 within glass substrate 302 as shown include the ability to use existing processing techniques already in place for semiconductor device fabrication. This simplifies manufacture, and reduces cost.

Figure 4A:
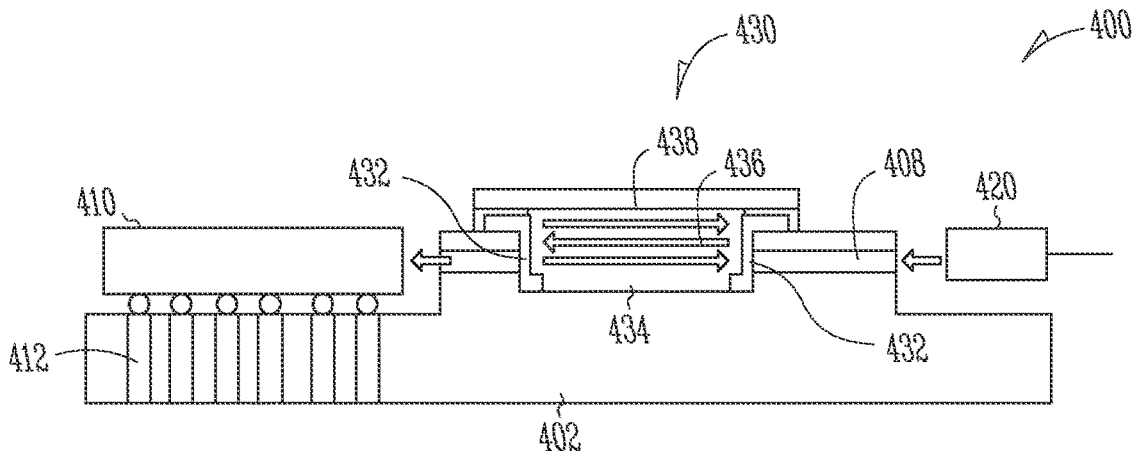
FIG. 4A shows a cross section view of an optical resonator in accordance with some example embodiments.
Figure 4B:
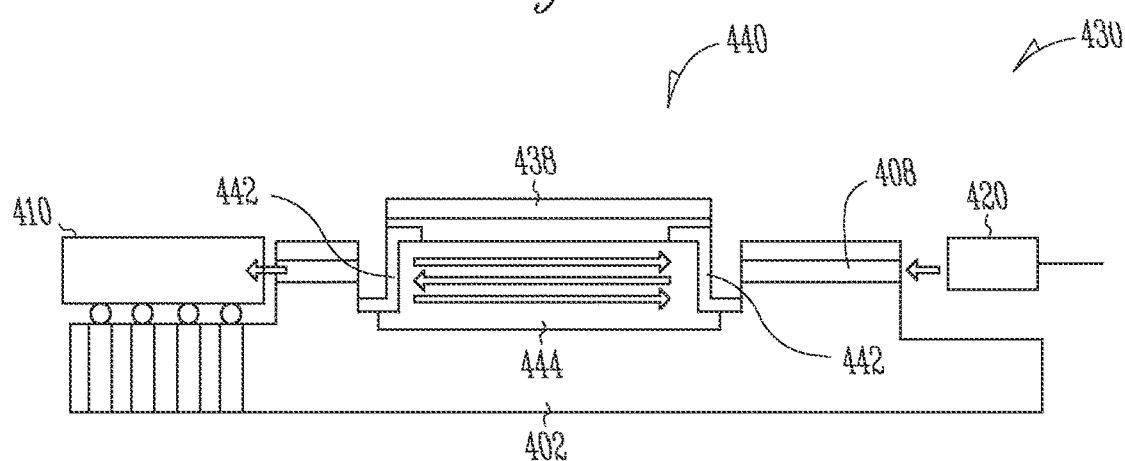
FIG. 4B shows a cross section view of another optical resonator in accordance with some example embodiments.
Figure 4C:
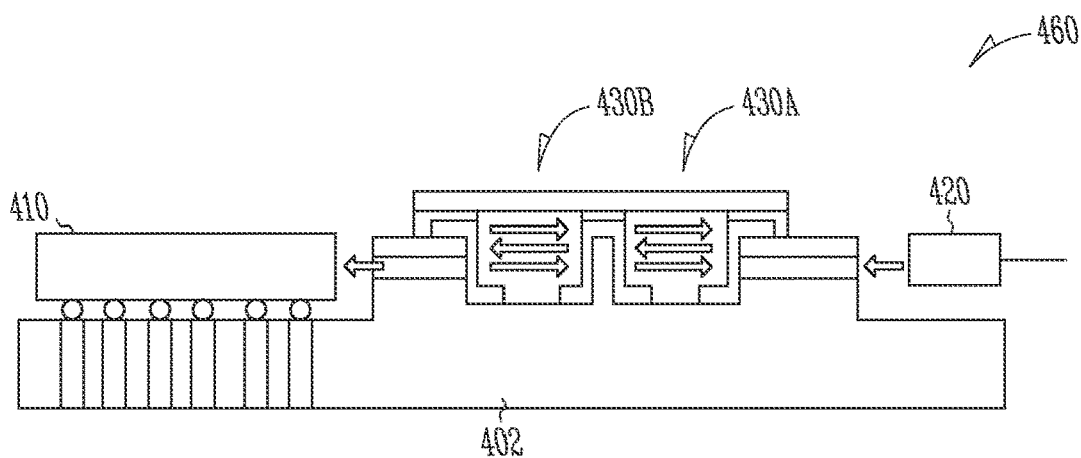
FIG. 4C shows a cross section view of another optical resonator in accordance with some example embodiments.
Figure 5A:
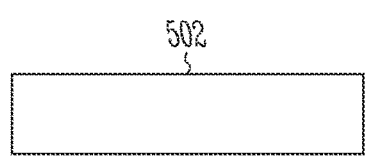
FIG. 5A-K shows selected manufacturing steps to form an optical resonator in accordance with some example embodiments.
Figure 5B:
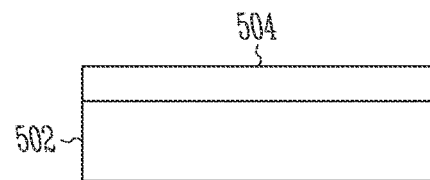
Figure 5C:
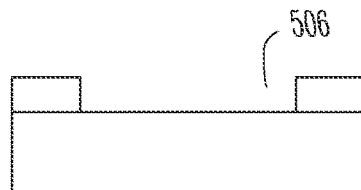
Figure 5D:
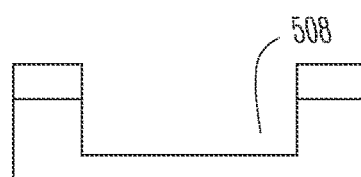
Figure 5E:
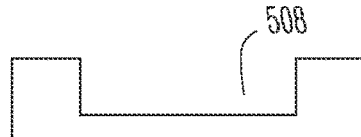
Figure 5F:
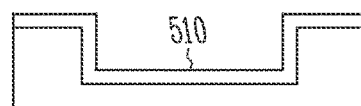
Figure 5G:
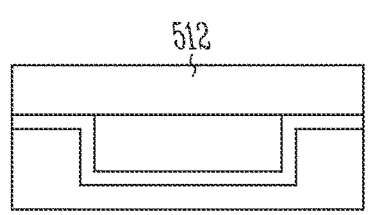
Figure 5H:
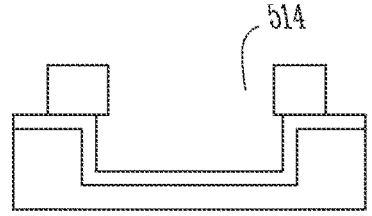
Figure 5I:
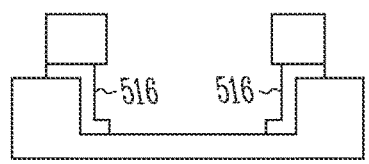
Figure 5J:
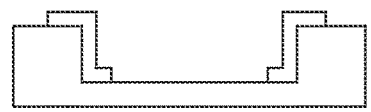
Figure 5K:
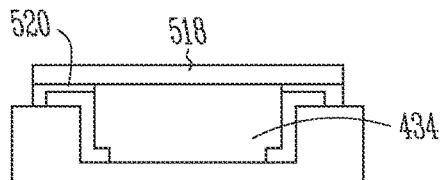
Figure 6I:
FIG. 6A-N shows selected manufacturing steps to form an optical resonator in accordance with some example embodiments.
Figure 6J:
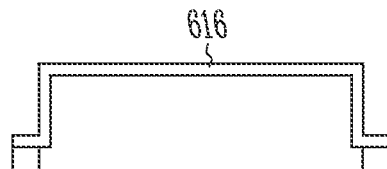
Figure 6K:
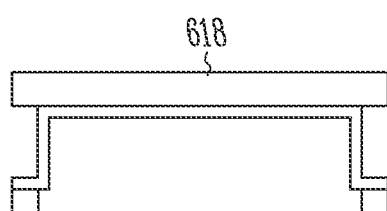
Figure 6L:
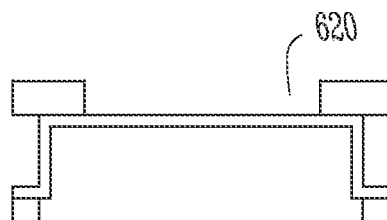
Figure 6M:
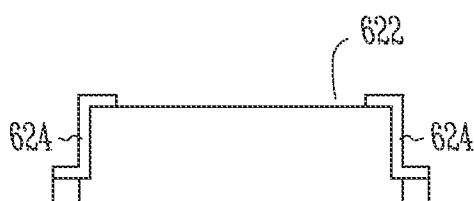
Figure 6N:
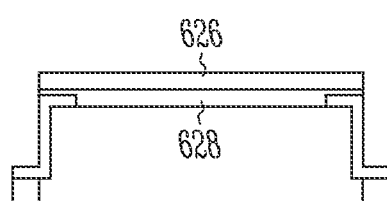

FIGS. 4A, 4B, and 4C show examples of an optical resonator 430 incorporated into a system 400 similar to a portion of electro-optical system 100 from FIG. 1A. System 400 includes a PIC 410 and an optical fiber 420 coupled to a substrate 402, such as a glass interposer. In one example, the optical resonator 430 includes a Fabry-Perot resonator. The optical resonator 430 is shown coupled between the optical fiber 420 and the PIC 410 through a waveguide 408.

The PIC 410 is further shown with vias 412 that pass through the substrate 402 for subsequent connection to a circuit board or additional substrate. As noted above, the substrate 402 may be a glass interposer. In FIG. 4A, a pair of partially reflective mirrors 432 are formed on either end of a cavity 434 formed in the glass substrate 402. A protective lid 438 is included in FIG. 4A, covering the cavity 434. The protective lid 438 may be secured with an adhesive, or other securing techniques.

In operation, when light passes into the cavity 434 from the waveguide 408, light waves 436 will reflect back and forth within the cavity 434 due to the partially reflective mirrors 432. A lateral dimension of the cavity is carefully controlled to be a multiple of a wavelength of a desired frequency. When the light waves 436 reflect back and forth, destructive interference will tend to cancel out any unwanted frequencies that may serve as noise in the signal. A desired frequency of light will be constructively reinforced by the selected dimension of the cavity 434. In this way, the desired frequency is refined and reinforced by the optical resonator 430.

FIG. 4B shows an alternate configuration of an optical resonator 440 incorporated into a system 430 similar to a portion of electro-optical system 100 from FIG. 1A. The optical resonator 440 utilizes a doped rare earth material 444 in place of the cavity 434 used in the optical resonator 430 example. In one example, the rare earth material 444 includes Er3+ doped glass. In one example, the rare earth material 444 includes Nd3+ doped glass. These example ion dopants serve as optical amplifiers.

Similar to optical resonator 430, a pair of partially reflective mirrors 442 are formed on either end of the doped rare earth material 444 formed in the glass substrate 402. FIG. 4C illustrates a configuration where multiple optical resonators are formed in series within the substrate 402. FIG. 4C shows a system 460 with two optical resonators 430A, 430B located between the optical fiber 420 and the PIC 410. Although two optical resonators 430A, 430B are shown, more than two optical resonators in series are also within the scope of the invention. In one example, multiple optical resonators in series will further refine an optical frequency to a narrow band of variation, and further exclude signal noise.

In one example multiple optical resonators can be used in conjunction with a wavelength multiplexer. FIG. 1A shows a wavelength multiplexer 145 coupled between optical fiber 104B and a plurality of optical resonators 140 A plurality of waveguides 121 are shown exiting the wavelength multiplexer 145 and coupled to each optical resonator 140. In operation, the optical multiplexer multiplexes between a multi-frequency signal and a plurality of individual optical frequencies. The addition of the plurality of optical resonators 140 refines each separated frequency and enhances signal quality and strength. The inclusion of the plurality of optical resonators 140 can make a higher number of multiplexed frequency divisions feasible in contrast to configurations without a plurality of optical resonators 140. Although a pair of cavity optical resonators 430A, 430B are shown in FIG. 4C, multiple rare earth material optical resonators may also be used.

FIG. 5 shows one example of a manufacturing flow used to form optical resonator 430. In operation A, a substrate 502 such as a glass interposer is provided. In operation B, a mask layer 504 is formed over the substrate 502. In operation C, an opening 506 is formed in the mask layer 504. In operation D, a cavity 508 is formed using the opening 506 in the mask 504. In operation E, the mask layer 504 is removed, and the opening 508 remains. In operation F, a partially transmitting reflective layer 510 is formed within the cavity 508. One example of a partially transmitting reflective layer 510 includes a thin metal layer that allows some light to transmit, and reflects another portion of the light. Example method of depositing the partially transmitting reflective layer 510 include, but are not limited to, sputtering, ion assisted deposition, electron beam evaporation, etc.

In operation G, a second mask layer 512 is formed over the partially transmitting reflective layer 510 and the cavity 508. Although the second mask layer appears flat across the cavity 508, in practice, there may be a level of conformance of the second mask layer within the cavity 508. In operation H, a second opening 514 or openings are formed within the second mask layer 512. In operation I, selected portions of the partially transmitting reflective layer 510 are removed, for example by etching or other suitable removal process, to form the partially reflective mirrors 432 as shown in FIG. 4A. In operation J, the remaining second mask layer 512 is removed. In operation K, a protective lid 518 is provided, covering the cavity 434. The protective lid 518 may be secured with an adhesive 520, or other securing techniques.

FIG. 6 shows one example of a manufacturing flow used to form optical resonator 440. In operation A, a substrate 602 such as a glass interposer is provided. In operation B, a mask layer 604 is formed over the substrate 602. In operation C, an opening 606 is formed in the mask layer 504. In operation D, a dopant in introduced and diffused, implanted, or otherwise located within the opening 606 to form a doped rare earth region 608 similar to doped rare earth region 444 in FIG. 4B. In operation E, the mask layer 604 is removed, and the doped rare earth region 608 remains. In operation F, a second mask layer 610 is formed over the doped rare earth region 608. In operation G, selected portions of the second mask layer 610 are removed. In operation H, selected portions of the doped rare earth region 444 are removed. In operation I, the remaining portions of the second mask layer 610 are removed. In operation J, a partially transmitting reflective layer 616 is formed over the doped rare earth region 608. Deposition of the partially transmitting reflective layer 616 is similar to deposition of the partially transmitting reflective layer 510 from FIG. 5. In operation K, a third mask layer 618 is formed, and in operation L, a third opening 620 is formed. In operation M, selected portions of the partially transmitting reflective layer 616 are removed to form the pair of partially reflective mirrors 442 from FIG. 4B. In operation N a protective lid 626 is provided, covering the doped rare earth region 444. The protective lid 626 may be secured with an adhesive 628, or other securing techniques.

Figure 7A:
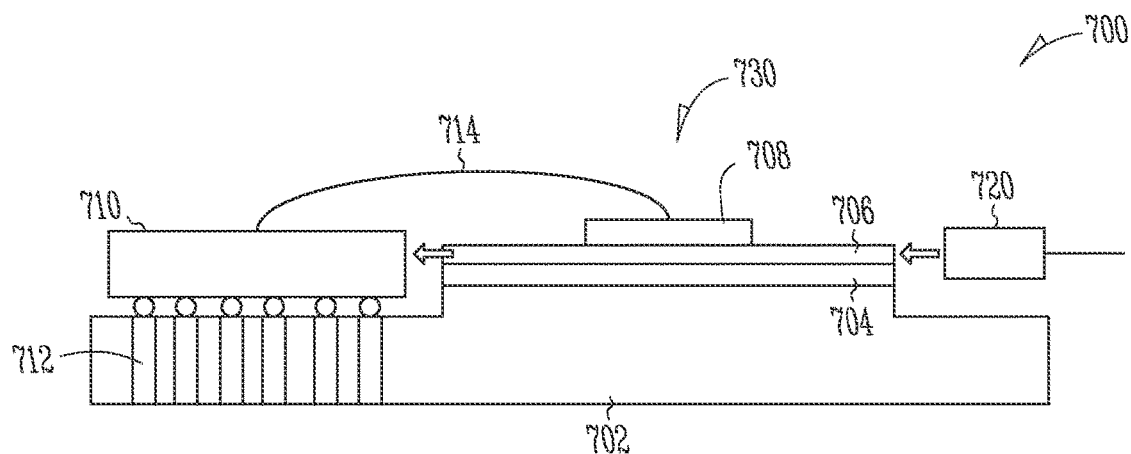
FIG. 7A shows a top view of an electro-optical switch in accordance with some example embodiments.
Figure 7B:
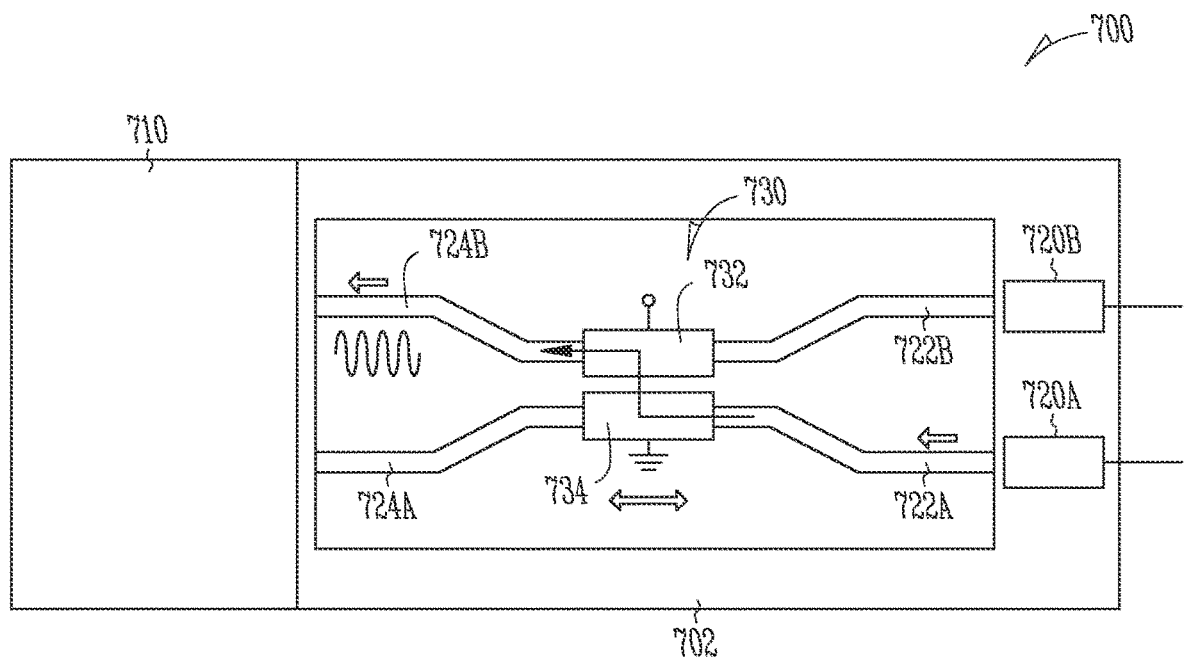
FIG. 7B shows a cross section view of the electro-optical switch from FIG. 7A in accordance with some example embodiments.

FIGS. 7A and 7B show an electro-optic switch 730 incorporated into a system 700 similar to a portion of electro-optical system 100 from FIG. 1A. System 700 includes a PIC 710 and a first optical fiber 720A and a second optical fiber 720B coupled to a substrate 702, such as a glass interposer. In one example, the electro-optic switch 730 includes a directional coupler switch. In the example of FIG. 7A, a wirebond connection 714 is coupled between the electro-optic switch 730 and the PIC 710 to facilitate feedback and control of the electro-optic switch 730. Although a wirebond connection 714 is shown, the invention is not so limited. Other connections such as electrical traces or alternate wiring configurations are also possible.

The PIC 710 is further shown with vias 712 that pass through the substrate 702 for subsequent connection to a circuit board or additional substrate. As noted above, the substrate 702 may be a glass interposer. In FIG. 7A, an electro-optical material layer 704 is located over the substrate 702, and one or more waveguides 706 are formed either on, on within the opto-electric layer 704. A metallic layer 708 is further shown over the waveguides 706 and electro-optical material layer 704. In one example, the metallic layer 708 is used to facilitate fabrication of one or more components of the electro-optic switch 730. Similar to other examples described above, in one example the electro-optical material may include $GaAs$, $PbMoO_4$, $TeO_2$, $T_{13}As_4$, $SrO_{0.75}Ba_{0.25}Nb_2O_6$, $LiNbO_3$, $LiTaO_3$, etc. The inclusion of an electro-optical material on the substrate 702 facilitates integral fabrication of the electro-optic switch 730 and reduced device size and device manufacturing cost.

FIG. 7B shows a top view of the electro-optic switch 730 from FIG. 7A. A first optical fiber 720A and a second optical fiber 720 are shown coupled to a respective first waveguide 722A and a second waveguide 722B. A third waveguide 724A and a fourth waveguide 724B are further shown in the figure. In one example, the electro-optic switch 730 enables selection of which of the first and second waveguides 722A, 722B is coupled with which of the third and fourth waveguides 724A, 724B. A first electrode 732 and a second electrode 734 are shown formed from the metallic layer 708 shown in FIG. 7A.

Using the electrodes 732, 734, an electric field can be controlled at the intersection of waveguides 722A, 722B, 724A, and 724B. Control of the electric field is used to vary a material property within the waveguides at the intersection of waveguides 722A, 722B, 724A, and 724B. In one example the material property that is varied is an index of refraction. By changing a comparative index of refraction between the waveguides 722A, 722B, 724A, and 724B, a selective coupling can be controlled. In one example, a propagating wave can be transferred from the one waveguide to another when two parallel waveguides are close to each other as shown in FIG. 7B. When an applied voltage is equal to zero, there is no phase mismatch. Thus, full transmission occurs to another waveguide. On the other hand, when the applied voltage is not equal to zero, a refractive index is changed and there is phase mismatch. Therefore, there is no light transfer from one to another.

In operation, the electro-optic switch 730 can therefore be used to select from a number of possible pathways within a network of waveguides. Returning to the example of FIG. 1A, a plurality of chip sub-assemblies 110A-D are shown, with a network of waveguides coupled between them and an electro-optic switch 150. As described above, the electro-optic switch 150 can select whether an optical signal is transferred between chip sub-assembly 110D and chip sub-assembly 110A or between chip sub-assembly 110D and chip sub-assembly 110B. Any number of switching selections are possible given the description of electro-optic switch 730 and an arrangement of waveguides and control circuitry. Although four chip sub-assemblies 110A-D are shown, the invention is not so limited. Any larger or smaller number of chip sub-assemblies can be used with optional selectable pathways controlled by electro-optic switches as described.

FIG. 8 shows one example of a manufacturing flow used to form electro-optic switch 730. In operation A, a substrate 802 such as a glass interposer is provided. In operation B, an electro-optical material 804 such as an example material listed above is deposited in a layer over the glass substrate 802. In operation C, a mask layer 806 is layered over the electro-optical material 804. In operation D, one or more openings 808 are formed in the a mask layer 306. In operation E, a dopant material 810 is formed within the opening 308. In one example a dopant material includes titanium, and the electro-optical material 804 includes LiNbO$_3$, although the invention is not so limited. Example method of depositing the dopant material 810 include, but are not limited to, sputtering, pulsed laser deposition, chemical vapor deposition, liquid phase epitaxy, sol-gel processing, etc.

In operation F, the remaining mask layer 806 is removed from the electro-optical material 304, leaving the dopant material 810 on a selected region of the electro-optical material 804. In operation G, an anneal or similar operation is performed, and the dopant material 810 is diffused into a selected region 812. In one example, selected region 812 operates as a waveguide, such as waveguides 722A, 722B, 724A, and 724B from FIG. 7B. In one example due to high processing temperature in diffusion, a quartz substrate 802 is used to withstand the operation. In one example, the electro-optical material 804 may be doped separately and later attached to the substrate 802 to avoid adverse effects from high diffusion temperatures.

In operation H, a second mask layer 814 is formed over the electro-optical material 804 and the selected region 812. In operation I, second regions 816 are formed within the second mask layer 814. In operation J, metal, such as copper or another conductor is deposited to form components 818 such as electrodes 732, 734 from FIG. 7B. In operation K, the remaining second mask layer 814 is removed, and the electro-optic switch 730 as shown in FIG. 7B is complete. One advantage of integral formation of devices such as electro-optic switch 730 within glass substrate 802 as shown include the ability to use existing processing techniques already in place for semiconductor device fabrication. This simplifies manufacture, and reduces cost.

Figure 9:
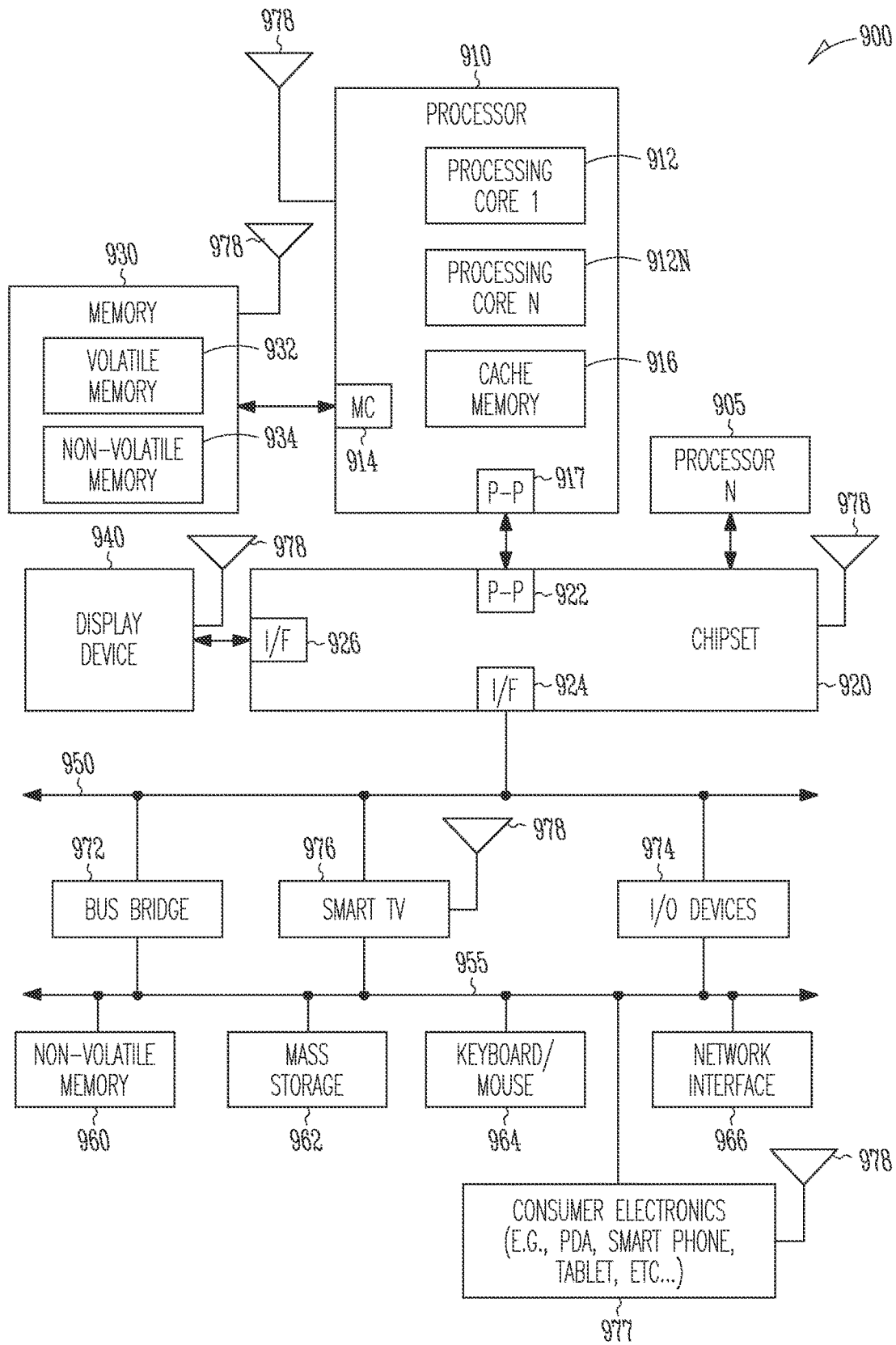
FIG. 9 shows a system that may incorporate optical and electro-optical devices and methods, in accordance with some example embodiments.

FIG. 9 illustrates a system level diagram, depicting an example of an electronic device (e.g., system) that may include one or more devices with photonic integrated circuits and optical or electro-optical components integrally formed with a glass interposer as described above. In one embodiment, system 900 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In some embodiments, system 900 includes a system on a chip (SOC) system.

In one embodiment, processor 910 has one or more processor cores 912 and 912N, where 912N represents the Nth processor core inside processor 910 where N is a positive integer. In one embodiment, system 900 includes multiple processors including 910 and 905, where processor 905 has logic similar or identical to the logic of processor 910. In some embodiments, processing core 912 includes, but is not limited to, pre-fetch logic to fetch instructions, decode logic to decode the instructions, execution logic to execute instructions and the like. In some embodiments, processor 910 has a cache memory 916 to cache instructions and/or data for system 900. Cache memory 916 may be organized into a hierarchal structure including one or more levels of cache memory.

In some embodiments, processor 910 includes a memory controller 914, which is operable to perform functions that enable the processor 910 to access and communicate with memory 930 that includes a volatile memory 932 and/or a non-volatile memory 934. In some embodiments, processor 910 is coupled with memory 930 and chipset 920. Processor 910 may also be coupled to a wireless antenna 978 to communicate with any device configured to transmit and/or receive wireless signals. In one embodiment, an interface for wireless antenna 978 operates in accordance with, but is not limited to, the IEEE 802.11 standard and its related family, Home Plug AV (HPAV), Ultra Wide Band (UWB), Bluetooth, WiMax, or any form of wireless communication protocol.

In some embodiments, volatile memory 932 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 934 includes, but is not limited to, flash memory, phase change memory (PCM), read-only memory (ROM), electrically erasable programmable read-only memory (EEPROM), or any other type of non-volatile memory device.

Memory 930 stores information and instructions to be executed by processor 910. In one embodiment, memory 930 may also store temporary variables or other intermediate information while processor 910 is executing instructions. In the illustrated embodiment, chipset 920 connects with processor 910 via Point-to-Point (PtP or P-P) interfaces 917 and 922. Chipset 920 enables processor 910 to connect to other elements in system 900. In some embodiments of the example system, interfaces 917 and 922 operate in accordance with a PtP communication protocol such as the Intel® QuickPath Interconnect (QPI) or the like. In other embodiments, a different interconnect may be used.

In some embodiments, chipset 920 is operable to communicate with processor 910, 905N, display device 940, and other devices, including a bus bridge 972, a smart TV 976, I/O devices 974, nonvolatile memory 960, a storage medium (such as one or more mass storage devices) 962, a keyboard/mouse 964, a network interface 966, and various forms of consumer electronics 977 (such as a PDA, smart phone, tablet etc.), etc. In one embodiment, chipset 920 couples with these devices through an interface 924. Chipset 920 may also be coupled to a wireless antenna 978 to communicate with any device configured to transmit and/or receive wireless signals.

Chipset 920 connects to display device 940 via interface 926. Display 940 may be, for example, a liquid crystal display (LCD), a light emitting diode (LED) array, an organic light emitting diode (OLED) array, or any other form of visual display device. In some embodiments of the example system, processor 910 and chipset 920 are merged into a single SOC. In addition, chipset 920 connects to one or more buses 950 and 955 that interconnect various system elements, such as I/O devices 974, nonvolatile memory 960, storage medium 962, a keyboard/mouse 964, and network interface 966. Buses 950 and 955 may be interconnected together via a bus bridge 972.

In one embodiment, mass storage device 962 includes, but is not limited to, a solid state drive, a hard disk drive, a universal serial bus flash memory drive, or any other form of computer data storage medium. In one embodiment, network interface 966 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 9 are depicted as separate blocks within the system 900, the functions performed by some of these blocks may be integrated within a single semiconductor circuit or may be implemented using two or more separate integrated circuits. For example, although cache memory 916 is depicted as a separate block within processor 910, cache memory 916 (or selected aspects of 916) can be incorporated into processor core 912.

To better illustrate the method and apparatuses disclosed herein, a non-limiting list of embodiments is provided here:

Example 1 includes an electro-optic system. The system includes a photonic die, a glass interposer coupled to the photonic die, an optical fiber connector coupled to the glass interposer, and an optical resonator integrated with the glass interposer and coupled between the optical fiber connector and the photonic die.

Example 2 includes the electro-optic system of example 1, wherein the photonic die is paired with a semiconductor die in a chip sub-assembly.

Example 3 includes the electro-optic system of any one of examples 1-2, wherein the photonic and semiconductor die are coupled together by a bridge die located beneath both the photonic die and the semiconductor die.

Example 4 includes the electro-optic system of any one of examples 1-3, wherein the optical resonator includes a cavity in the glass interposer and a pair of partially reflective mirrors.

Example 5 includes the electro-optic system of any one of examples 1-4, wherein the optical resonator includes a rare earth material region and a pair of partially reflective mirrors.

Example 6 includes the electro-optic system of any one of examples 1-5, wherein the rare earth material region includes Er3+ dopant in the glass interposer.

Example 7 includes the electro-optic system of any one of examples 1-6, wherein the photonic die is recessed within a cavity in the glass interposer to align with at least one waveguide formed in the glass interposer.

Example 8 includes the electro-optic system of any one of examples 1-7, wherein multiple optical resonators are coupled in series, and integrated with the glass interposer and coupled between the optical fiber connector and the photonic die.

Example 9 includes the electro-optic system of any one of examples 1-8, further including a wavelength multiplexer between the optical fiber connector and the photonic die with multiple waveguides multiplexed to a single optical fiber.

Example 10 includes the electro-optic system of any one of examples 1-9, wherein each of the multiple waveguides includes a respective optical resonator.

Example 11 includes a computing system. The system includes a device housing and an electro-optic system within the device housing, the electro-optic system including a photonic die, a glass interposer coupled to the photonic die, an optical fiber connector coupled to the glass interposer, and an optical resonator integrated with the glass interposer and coupled between the optical fiber connector and the photonic die. The computing system also includes one or more memory dies coupled to the electro-optic system.

Example 12 includes the computing system of example 11, further including an antenna.

Example 13 includes the computing system of any one of examples 11-12, wherein the device housing includes a server device housing.

Example 14 includes the computing system of any one of examples 11-13, wherein the photonic die is paired with a semiconductor die in a chip sub-assembly.

Example 15 includes the computing system of any one of examples 11-14, wherein the photonic die is recessed within a cavity in the glass interposer to align with at least one waveguide formed in the glass interposer.

Example 16 includes the computing system of any one of examples 11-15, wherein multiple optical resonators are coupled in series, and integrated with the glass interposer and coupled between the optical fiber connector and the photonic die.

Example 17 includes the computing system of any one of examples 11-16, further including a wavelength multiplexer between the optical fiber connector and the photonic die with multiple waveguides multiplexed to a single optical fiber.

Example 18 includes a method of forming an electro-optic device. The method includes forming a resonator chamber integrally in a glass substrate, forming a pair of partially reflective mirrors on opposing sides of the resonator chamber, coupling a photonic die to the glass substrate and to a first side of the pair of partially reflective mirrors, and coupling an optical fiber to a second side of the pair of partially reflective mirrors.

Example 19 includes the method of example 18, wherein forming a resonator chamber includes forming a cavity within the glass substrate.

Example 20 includes the method of any one of examples 18-19, wherein forming a resonator chamber includes forming a rare earth material region within the glass substrate.

Example 21 includes the method of any one of examples 18-20, wherein forming a rare earth material region includes doping a region of the glass substrate with Er3+ ions.

Example 22 includes the method of any one of examples 18-21, wherein coupling a photonic die to the glass substrate includes recessing the photonic die in the glass substrate to align with one or more waveguides coupled to one of the partially reflective mirrors.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for the purpose of describing particular example embodiments only and is not intended to be limiting. As used in the description of the example embodiments and the appended examples, the singular forms "a," "an." and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The invention claimed is:

1. An electro-optic system, comprising:
  a photonic die;
  a glass interposer coupled to the photonic die;
  an optical fiber connector coupled to the glass interposer, and an optical resonator integrated with the glass interposer and coupled between the optical fiber connector and the photonic die, wherein:

the photonic die is paired with a semiconductor die in a chip sub-assembly; and the photonic die and semiconductor die are coupled together by a bridge die located beneath both the photonic die and the semiconductor die.

2. The electro-optic system of claim 1, wherein the optical resonator includes a cavity in the glass interposer and a pair of partially reflective mirrors.

3. The electro-optic system of claim 1, wherein the optical resonator includes a rare earth material region and a pair of partially reflective mirrors.

4. The electro-optic system of claim 3, wherein the rare earth material region includes Er3+ dopant in the glass interposer.

5. The electro-optic system of claim 1, wherein the photonic die is recessed within a cavity in the glass interposer to align with at least one waveguide formed in the glass interposer.

6. The electro-optic system of claim 1, wherein multiple optical resonators are coupled in series, and integrated with the glass interposer and coupled between the optical fiber connector and the photonic die.

7. The electro-optic system of claim 1, further including a wavelength multiplexer between the optical fiber connector and the photonic die with multiple waveguides multiplexed to a single optical fiber.

8. The electro-optic system of claim 7, wherein each of the multiple waveguides includes a respective optical resonator.

9. A computing system, comprising:
a device housing;
an electro-optic system within the device housing, the electro-optic system comprising:
a photonic die;
a glass interposer coupled to the photonic die;
an optical fiber connector coupled to the glass interposer, and an optical resonator integrated with the glass interposer and coupled between the optical fiber connector and the photonic die, wherein:
the photonic die is paired with a semiconductor die in a chip sub-assembly; and
the photonic die and semiconductor die are coupled together by a bridge die located beneath both the photonic die and the semiconductor die; and
one or more memory dies coupled to the electro-optic system.

10. The computing system of claim 9, further including an antenna.

11. The computing system of claim 9, wherein the device housing includes a server device housing.

12. The computing system of claim 9, wherein the photonic die is paired with a semiconductor die in a chip sub-assembly.

13. The computing system of claim 9, wherein the photonic die is recessed within a cavity in the glass interposer to align with at least one waveguide formed in the glass interposer.

14. The computing system of claim 9, wherein multiple optical resonators are coupled in series, and integrated with the glass interposer and coupled between the optical fiber connector and the photonic die.

15. The computing system of claim 9, further including a wavelength multiplexer between the optical fiber connector and the photonic die with multiple waveguides multiplexed to a single optical fiber.

* * * * *